(12) United States Patent
Tagart et al.

(10) Patent No.: US 9,856,654 B1
(45) Date of Patent: Jan. 2, 2018

(54) COLLAPSIBLE STAIR WITH FOLDABLE RAMP

(71) Applicants: Wallace Tagart, Glendale, AZ (US); Yvonne Tagart, Gendale, AZ (US)

(72) Inventors: Wallace Tagart, Glendale, AZ (US); Yvonne Tagart, Gendale, AZ (US)

(*) Notice: Subject to any disclaimer, the term of this patent is extended or adjusted under 35 U.S.C. 154(b) by 0 days.

(21) Appl. No.: 15/362,309

(22) Filed: Nov. 28, 2016

(51) Int. Cl.
- E04F 11/06 (2006.01)
- E04F 11/00 (2006.01)
- A01K 1/035 (2006.01)
- E06C 1/38 (2006.01)
- E06C 1/39 (2006.01)

(52) U.S. Cl.
CPC ............ *E04F 11/062* (2013.01); *A01K 1/035* (2013.01); *E04F 11/002* (2013.01); *E06C 1/38* (2013.01); *E06C 1/39* (2013.01); *E04F 2011/005* (2013.01)

(58) Field of Classification Search
CPC ......... E04F 11/00; E04F 11/06; E04F 11/062; E04F 11/068; E04F 11/002; E04F 2011/005; A01K 1/035; E06C 1/38; E06C 1/39
USPC ................ 312/235.1, 330.1; 108/91, 92, 93; 182/20, 23, 33.5
See application file for complete search history.

(56) References Cited

U.S. PATENT DOCUMENTS

| | | | | |
|---|---|---|---|---|
| 7,789 A | * | 11/1850 | Shoenberger | A47B 1/08 108/93 |
| 183,924 A | * | 10/1876 | Harrison | A47C 12/02 182/33 |
| 1,681,879 A | * | 8/1928 | Putnam | A47C 12/02 182/33.5 |
| 2,433,699 A | * | 12/1947 | Keen | A47C 12/02 182/33.5 |
| 2,495,374 A | * | 1/1950 | Horn | A47B 79/00 182/28 |
| 2,563,436 A | * | 8/1951 | Toth | A47C 12/02 182/33.5 |
| 2,614,017 A | * | 10/1952 | Mugnier | A47B 17/036 108/93 |
| 2,628,879 A | * | 2/1953 | Schultz | A47B 79/00 297/423.21 |

(Continued)

FOREIGN PATENT DOCUMENTS

GB    2320408 A    6/1998

OTHER PUBLICATIONS http://www.amazon.com/Best-Choice-Products%C2%AE-Folding-Portable/dp/B00LXKWDEM.
http://www.alibaba.com/showroom/folded-lightweight-folding-dog-ramp-step.html.

*Primary Examiner* — Katherine Mitchell
*Assistant Examiner* — Shiref Mekhaeil
(74) *Attorney, Agent, or Firm* — Booth Udall Fuller, PLC

(57) ABSTRACT

A collapsible stair with foldable ramp can include a first step, and a second step nestable within the first step such that when the collapsible stair is in a closed position the second step is aligned with the first step and when the collapsible stair is in an open position a lateral offset between the second step and the first step is increased. A third step can be nestable within the first step such that when the collapsible stair is in a closed position the third step is aligned with the second step and is in an open position a lateral offset between the third step and the second step is increased. A ramp can be rotatably coupled to the first step to rotate from a stair position to a ramp position, wherein the ramp position comprises the second step and the third step being covered by the ramp.

13 Claims, 5 Drawing Sheets

(56) References Cited

U.S. PATENT DOCUMENTS

| | | | | |
|---|---|---|---|---|
| 3,035,671 A | * | 5/1962 | Sicherman | E06C 1/005 108/100 |
| 3,488,898 A | * | 1/1970 | Scaggs | E04H 3/123 182/132 |
| 3,564,790 A | * | 2/1971 | Rehfeld | E04F 11/06 108/92 |
| 3,667,171 A | * | 6/1972 | McClelland | A47C 1/126 52/9 |
| 4,025,137 A | * | 5/1977 | Wyler | A47B 45/00 108/93 |
| 4,068,770 A | * | 1/1978 | Boehringer | B60R 3/02 14/71.1 |
| 4,133,531 A | * | 1/1979 | Arteaga | A63B 69/0097 273/395 |
| 4,712,264 A | * | 12/1987 | Voith | A61G 3/061 14/69.5 |
| 4,937,902 A | * | 7/1990 | Ceike Shapiro | A47C 29/003 182/34 |
| 4,991,691 A | * | 2/1991 | Brawer | E04F 11/002 182/106 |
| 5,319,818 A | * | 6/1994 | Baranowski | A61G 3/061 14/71.1 |
| 5,634,440 A | | 6/1997 | Mogck | |
| 5,735,586 A | * | 4/1998 | Cheng | A47B 46/00 182/35 |
| 5,822,929 A | * | 10/1998 | Guiles | E04H 3/123 52/8 |
| 6,267,082 B1 | | 7/2001 | Naragon et al. | |
| 6,463,613 B1 | | 10/2002 | Thompson | |
| 6,484,344 B1 | * | 11/2002 | Cooper | A61G 3/061 14/71.1 |
| 6,598,562 B1 | * | 7/2003 | Dutkiewicz | A01K 1/035 119/706 |
| 6,854,216 B2 | * | 2/2005 | Ahrens | A47C 1/126 52/183 |
| 6,964,246 B2 | | 11/2005 | Wolfington et al. | |
| 7,000,753 B2 | * | 2/2006 | Cavallaro, Jr. | B65G 11/023 193/2 R |
| 7,010,825 B1 | * | 3/2006 | Finch Salas | A61G 3/061 14/69.5 |
| 7,082,637 B1 | * | 8/2006 | Griffin | B65G 69/30 14/69.5 |
| 7,350,255 B2 | * | 4/2008 | Zhang | B65G 69/30 14/69.5 |
| D596,812 S | * | 7/2009 | Sicken | D30/199 |
| D599,062 S | * | 8/2009 | Jakubowski | D30/199 |
| 7,621,236 B2 | | 11/2009 | Steffey et al. | |
| 8,403,419 B2 | * | 3/2013 | Damrow | A47C 16/02 182/33 |
| 8,468,632 B1 | * | 6/2013 | Ricci | E01D 15/124 14/69.5 |
| 8,899,188 B1 | | 12/2014 | Douglas et al. | |
| 2004/0032142 A1 | * | 2/2004 | Sherrer | B60P 1/435 296/61 |
| 2006/0249086 A1 | * | 11/2006 | Dietz | A01K 1/033 119/28.5 |
| 2007/0006816 A1 | * | 1/2007 | Dietz | A01K 1/033 119/482 |
| 2007/0234491 A1 | * | 10/2007 | Bailie | B65G 69/30 14/69.5 |
| 2008/0164724 A1 | * | 7/2008 | Burnett | A47B 67/04 296/190.02 |
| 2009/0233740 A1 | * | 9/2009 | Gensler | A63B 69/0002 473/497 |
| 2012/0060769 A1 | | 3/2012 | Weber | |
| 2012/0132480 A1 | * | 5/2012 | Gomez Varela | B65G 69/30 182/21 |
| 2013/0047937 A1 | | 2/2013 | Chery | |
| 2013/0111663 A1 | * | 5/2013 | Brown | A47C 21/00 5/507.1 |
| 2014/0123910 A1 | | 5/2014 | Rorke et al. | |
| 2014/0237739 A1 | * | 8/2014 | Thompson | A63C 19/10 14/2.4 |
| 2015/0122581 A1 | | 5/2015 | Mahre | |
| 2017/0253445 A1 | * | 9/2017 | Giannatti | B65G 69/30 |

\* cited by examiner

COLLAPSIBLE STAIR WITH FOLDABLE RAMP

TECHNICAL FIELD

Embodiments of the present disclosure relate to the field of a collapsible stair with foldable ramp and methods for using the same.

BACKGROUND

Pets, animals, children, and short persons can benefit by gaining access to elevated points otherwise difficult or impossible to reach under normal circumstances, such as access into cars, trucks, or other vehicles, as well as on and off patios, decks, furniture, or other areas that may be inconvenient to access because of height.

Steps, stairs, ladders, and ramps, are known ways for improving access to elevated positions, and various devices have been made available to help persons, pets, and animals better access elevated positions. For example, US publication 2013/0047937 is directed to a telescoping pet ramp with a ramp segment telescopically extendable from a compact state to an extended state. US publication 2014/0123910 is directed to a folding pet ramp that includes a telescoping handle. US publication 2015/0122581 is directed to a utility ramp that folds onto a collapsible set of steps. U.S. Pat. No. 6,267,082 is directed to a ramp for assisting an animal in inclined walking between two different levels. U.S. Pat. No. 7,621,236 is directed to a pet ramp and step that includes a frame, an upper platform member, and a lower platform member. The leg support member is foldable such that it can fold under the frame to create a storable apparatus. US publication 2012/0060769 is directed to a pet step device including one or more pet steps. U.S. Pat. No. 5,634,440 is directed to a convertible step and ramp combination having a frame and removable steps, which may be converted into a ramp.

SUMMARY

A need exists to provide an improved stair ramp. Accordingly, in one aspect, a stair ramp can comprise a first step, and a second step nestable within the first step such that when the collapsible stair is in a closed position the second step is aligned with the first step and when the collapsible stair is in an open position a lateral offset between the second step and the first step is increased. A third step can be nestable within the first step and the second step such that when the collapsible stair is in a closed position the third step is aligned with the second step and when the collapsible stair is in an open position a lateral offset between the third step and the second step is increased. A ramp can be rotatably coupled to the first step to rotate from a stair position to a ramp position, wherein the stair position can comprises the second step and the third step being exposed from the ramp, wherein the ramp can overlay the back surface of the collapsible stair, and wherein the ramp position can comprise the second step and the third step being covered by the ramp. The first step, the second step, and the third step can share a common footprint in the closed position.

The stair ramp can further comprise a stair position with the ramp overlaying the first step and the back surface of the collapsible stair such that a user can step on the first step, the second step, and the third step to ascend or descent the collapsible stair. The first step can be positioned at a first height, the second step can be positioned at a second height less than the first height, and the third step can be positioned at a third height less than the second height. The first step can be formed as a hollow first box comprising no more than 5 sides, the second step can be formed as a hollow second box smaller than the first box and comprising no more than 5 sides, and the third step can be formed as part of a hollow third box smaller than the second box and comprising an openable sixth for storage. An inner width of the first stair can be greater than an outer width of the second stair, and an inner width of the second stair can be greater than an outer width of the third stair. The first stair, the second stair, and the third stair can be pivotably attached and move rotationally between the open position and the closed position. The first stair, the second stair, and the third stair can be slidably attached and move translationally between the open position and the closed position.

In another aspect, a stair ramp can comprise a first step, and a second step nestable within the first step such that when the collapsible stair is in a closed position the second step is aligned with the first step and when the collapsible stair is in an open position a lateral offset between the second step and the first step is increased. A third step can be nestable within the first step and the second step such that when the collapsible stair is in a closed position the third step is aligned with the second step and when the collapsible stair is in an open position a lateral offset between the third step and the second step is increased. A ramp can be rotatably coupled to the first step to rotate from a stair position to a ramp position, wherein the stair position comprises the second step and the third step being exposed from the ramp, and wherein the ramp position comprises the second step and the third step being covered by the ramp.

The stair position can further comprise the ramp overlaying the back surface of the collapsible stair. The stair position further comprise the ramp overlaying the first step and the back surface of the collapsible stair such that a user can step on the first step, the second step, and the third step to ascend or descent the collapsible stair. The first step can be positioned at a first height, the second step can be positioned at a second height less than the first height, and the third step can be positioned at a third height less than the second height. The stair ramp can further comprise the first step, the second step, and the third step sharing a common footprint in the closed position. The first stair, the second stair, and the third stair can be pivotably attached and move rotationally between the open position and the closed position. The first stair, the second stair, and the third stair can be slidably attached and move translationally between the open position and the closed position.

In yet another aspect, a stair ramp can comprise a first step, and a second step nestable within the first step such that when the collapsible stair is in a closed position the second step is aligned with the first step and when the collapsible stair is in an open position a lateral offset between the second step and the first step is increased. A ramp can be rotatably coupled to the first step to rotate from a stair position with the ramp resting against a back of the first step to a ramp position.

The stair ramp can further comprise the ramp comprising a first ramp segment comprising a depth substantially equal to a depth of the first stair. The stair position can further comprise the first ramp segment overlaying the first step and a second ramp segment resting against the back surface of the first stair such that a user can step on the first step and the second step to ascend or descent the collapsible stair. The first step can be positioned at a first height and the second step can be positioned at a second height less than the first height. The first stair and the second stair can be pivotably attached and move rotationally between the open position and the closed position. The first stair and the second stair can be slidably attached and move translationally between the open position and the closed position.

DETAILED DESCRIPTION

Figure 1A:
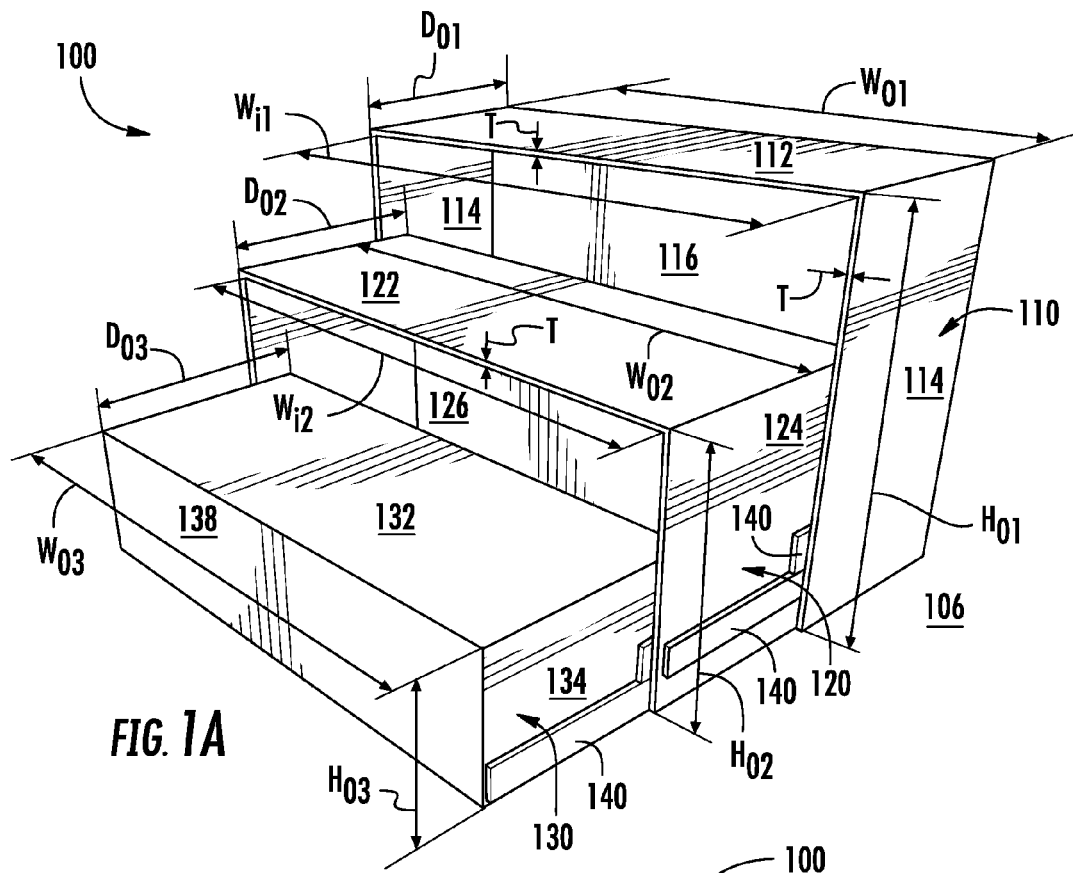
FIGS. 1A-1F illustrate various view of an embodiment of a collapsible stair with foldable ramp.

This disclosure, its aspects and implementations, are not limited to the specific material types, system component examples, or methods disclosed herein. Many additional components, manufacturing and assembly procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity and because one of ordinary skill in the art will understand the breadth of various other alternate examples from the disclosure and alternative examples provided herein.

While this disclosure includes a number of embodiments in many different forms, there is shown in the drawings and will herein be described in detail, particular embodiments with the understanding that the present disclosure is to be considered as an exemplification of the principles of the disclosed methods and systems, and is not intended to limit the broad aspect of the disclosed concepts to the embodiments illustrated.

In the following description, numerous specific details are set forth, such as specific configurations, sizes, compositions, and processes, in order to provide a thorough understanding of the disclosure. In other instances, well-known aspects have not been described in particular detail in order to not unnecessarily obscure the disclosure. Furthermore, it is to be understood that the various embodiments shown in the FIGs. are illustrative representations and are not necessarily drawn to scale.

The terms "over," "under," and "between," as used herein, refer to relative positions of one feature with respect to other features. One feature deposited or disposed above, below, over, or under another feature may be directly in contact with the other feature or may have one or more intervening features. One feature deposited or disposed between features may be directly in contact with the features or may have one or more intervening features. A first feature "on" a second feature may be directly in contact with the second feature or may have one or more intervening features.

Embodiments in the disclosure present devices, methods, and systems to improve one or more of stairs, ramps, ladders or other devices used for increasing height or providing access to high, inaccessible, or hard to reach places. FIGS. 1A-1F illustrate various views and arrangements of a stair ramp 100. FIG. 1A illustrates the stair ramp 100, which can also be referred to as a collapsible stair ramp, a collapsible stair with foldable ramp, or a portable and collapsible pet stair ramp. The stair ramp 100 can be formed generally, or at least in part, of one or more of wood, plastic, metal, ceramics, glass or tempered glass, tile, fiberglass, textiles, foam, and other suitable materials. Woods contemplated herein include natural woods such as pine, oak, ash, cherry, or other exogenous wood, whether hardwood or softwood, as well as endogenous woods such as bamboo or palm. Woods contemplated herein further include engineered wood or cellulose products including particleboard, pressboard, oriented strand board (OSB), plywood, wood veneers, tempered hardboard such as Masonite, or other similar materials. Plastics contemplated herein include polypropylene, polyethylene (PE), vinyl, polyvinylchloride (PVC), polycarbonate, Acrylonitrile butadiene styrene (ABS) or any other plastic. Metals contemplated herein include aluminum, steel, stainless steel, nickel, chrome, copper, brass, or other suitable metal which can be used structurally, decoratively, or both, and can include panels, planks, brackets, flanges, braces, hardware, thin layers or sheets, which can be formed by plating, coating, foil, or in any other way. In some instances portions or an entirety of the stair ramp 100 can be covered with carpet or textile 144, as well as with any other suitable material for one or more of comfort, traction, durability, safety, or looks.

The stair ramp 100 can be made of strong, durable, and lightweight materials for use both indoors and outdoors by persons, pets, or both. Children and short persons can benefit by gaining access to elevated points otherwise difficult or impossible to reach under normal circumstances. Pets can similarly benefit by gaining easier access into cars, trucks, or other vehicles, as well as on and off patios, decks, furniture, or other areas that may be inconvenient to access because of height. As used herein, pets include cats, dogs, rabbits, gerbils, ferrets, goats, sheep, birds, turtles, snakes, or other common or exotic pets including any mammal, reptile, bird, or other pet. A total weight of the stair ramp 100 can allow for convenient and ready mobility by having the stair ramp 100 being moved or carried by a user. As non-limiting examples, the stair ramp 100 can weigh less than 11 kilograms (kg) (or 25 pounds (lbs.)) or less than 4.5 kg (or 10 lbs.), while in other instances the stair ramp can be very light, and can weigh less than 2 kg (or 5 lbs.), or less than or about 0.4 kg (or 1 lbs.), wherein about means within a percent difference of 20% or less, 10% or less, or 5% or less. In some instances, the wheels 102 and the handles 104 can be omitted as being unnecessary, or undesired as a convenience, such as when the stair ramp is very light, or about 0.4 kg, (or 1 lbs.).

Figure 1B:
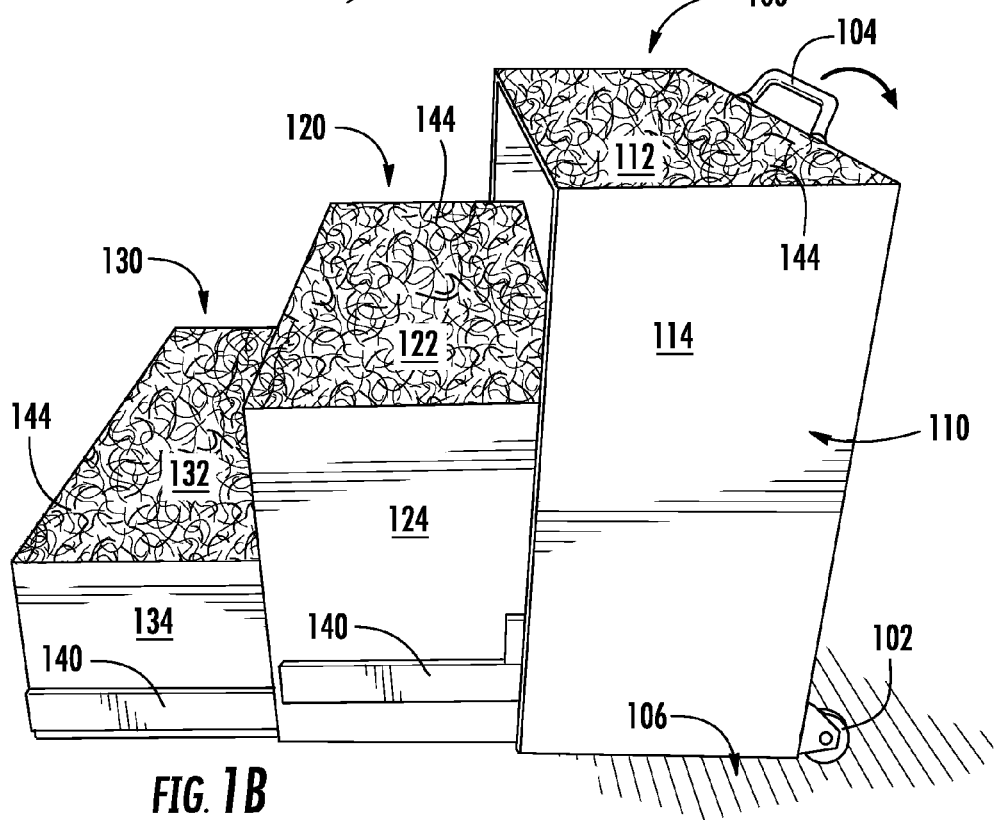

In some instances, the stair ramp 100 can comprise wheels or retractable wheels 102, shown e.g. in FIG. 1B, that allow for the stair ramp 100 to be rolled rather than carried by the user. The wheels 102 can include, one, two, three, four, or any desirable number of wheels. In some instances, the wheels 102 will be formed in pairs, so as to allow for improved balance and control. The wheels 102 can be positioned above the floor or surface 106 on which the stair ramp 100 is disposed so that the wheels 102 do not contact the floor 106 until a user or mover intends for the stair ramp 100 to be moved. The stair ramp 100 can then by moved by inclining the stair ramp 100 so that the base or lower edge 108 of the stair ramp is elevated above the floor 100, bringing the wheels 102 into contact with the floor 106 so that the wheels 102 can then support the weight of the stair ramp 100, facilitating easier movement of the stair ramp 100.

The stair ramp 100 can be comprised of a number of steps, such as a first step 110, a second step 120, and a third step 130. While the stair ramp 100 is described, for convenience and not by way of limitation, with respect to three steps, any desirable number of steps such as one step, two steps, three steps, four steps, five steps, or more steps can also be used.

Additionally, the steps can be of any desirable height or depth so that a ration of the height: depth, or the slope, steepness, incline, grade, or angle at which the steps increase can be adjusted or modified to a desirable slope. As a non-limiting example, the slope of the steps for the stair ramp 100 can be about 10°, 20°, 30°, 40°, or more.

The first step 110 can comprise a first tread 112 for receiving steps, footsteps, or weight from a user using the stair ramp 100, whether person or pet. The tread 112 can comprise a horizontal planar surface, and can be formed of any of the materials described above for the stair ramp 100 generally. In some instances, an additional material such as carpet 144 can be formed as part of, or placed over, the tread 112 to provide additional traction, texture, or durability. The first tread 112 in some instance can comprise slats, notches, grooves, or holes formed through the tread 112. The first tread 112 can comprise first and second ends coupled or directly attached to first and second, or left and right, risers or lateral risers 114. The first risers 114, like the tread 112, can be formed of any of the materials described above for the stair ramp 100 generally, including optional additional material or covering such as carpet 144.

The first step 112 can comprise an outer width or first outer width $W_{O1}$ that defines the outer lateral extent of the first step 110 or first tread 112, and can be coterminous with the first risers 114. In other instances, a nose, lip, or overhang 118, as shown e.g. in FIG. 1F, can be created by the first tread 112, extending past or beyond one or more surfaces of the first risers 114. While some of the various views of the stair ramp 100 show only one first riser 114, a person of ordinary skill in the art will understand that matching, identical, or mirror images of a first side or riser can have a corresponding second side or riser opposite the first side.

The first step 112 can similarly comprise an inner width or first inner width $W_{I1}$ that defines the inner lateral extent of the first step or first tread 112. The first step can comprise a thickness T, which can be constant or vary across the first step 112, and can also vary or remain constant across one or more of the steps forming the stair ramp 100. The thickness T can be defined by a distance between opposing inner and outer surfaces, or by a difference between the first outer width $W_{O1}$ and the first inner width $W_{I1}$. The first step 110 can also comprise a first outer height $H_{O1}$ that extends in a vertical direction perpendicular to the horizontal width $W_{O1}$. The first outer height $H_{O1}$ can extend from the lower edge 108 of the stair ramp 100 to a top or outer surface of the first tread 112. Similarly, first step 110 can additionally comprise a first outer depth $D_{O1}$ that extends in a direction perpendicular to the horizontal width $W_{O1}$ and the vertical height $H_{O1}$. The first step 110 can also comprise a corresponding first inner depth $D_{I1}$ and first inner height $H_{I1}$. The first step 110 can comprise a first back or back panel 116, similar to the first risers 114, that can be coupled to the first tread 112, and the first risers 114. Is some instances, the wheels 102 can be coupled to, or be in direct contact with, the back panel 116.

The stair ramp 100 can also comprise as a second step 120, the second step 120 comprising a second tread 122 for receiving steps, footsteps, or weight from a user using the stair ramp 100. The second tread 122 can comprise a horizontal planar surface, and can be formed of any of the materials described above with respect to first tread 112. The second tread 122 can comprise first and second ends coupled or directly attached to first and second, or left and right, risers or lateral risers 124. The second risers 124, like the tread 122, can be formed of any of the materials described above.

The second step 122 can comprise an outer width or second outer width $W_{O2}$ that defines the outer lateral extent of the second step 120 or second tread 122, and can be coterminous with the second risers 124. In other instances, a nose, lip, or overhang, similar to nose 118, can be created by the second tread 124 extending past or beyond one or more surfaces of the second risers 124. The second tread 122 in some instance can comprise slats, notches, grooves, or holes formed through the tread 122. The second step 120 can similarly comprise an inner width or second inner width $W_{I2}$ that defines the inner lateral extent of the second step 120 or second tread 122. The second step 120 can also comprise the thickness T, which can be constant or vary across the second step 120. The second step 120 can also comprise a second outer height $H_{O2}$ that extends in a vertical direction perpendicular to the horizontal width $W_{O2}$. Similarly, second step 120 can additionally comprise a second outer depth $D_{O2}$ that extends in a direction perpendicular to the horizontal width $W_{O2}$ and the vertical height $H_{O2}$. The second step 120 can also comprise a corresponding second inner depth $D_{I2}$ and second inner height $H_{I2}$.

The second step 120 can be nestable within the first step 110 such that when the stair ramp 100 is in a closed or collapsed position the second step 120 can be aligned with, or within a footprint of, the first step 110. Alternately, when the collapsible stair 100 is in an open position, a lateral offset between the second step 120 and the first step 110 is increased such that an entirety, substantially an entirety, or a majority of the first step 110 and the second step 120 do not overlap. Stated another way, no portion, or only a small portion, such as less than or equal to 5%, 10%, or 20% of the first step 110 and the second step 120 overlap or share a footprint in the open or non-nested position. In any event, the first step 110 and the second step 120 can be slidably coupled together with alignment members, connecting members, sliding tracks, drawer slides, wheels, or pivoting arms 140 as well as with other suitable attachment mechanisms. The second step 120 can comprise a second back or back panel 126 that is similar to the second risers 124, wherein the second back 126 can be coupled to the second tread 122, and the second risers 124.

The stair ramp 100 can also comprise as a third step 130, the third step 130 comprising a third tread 132 for receiving steps, footsteps, or weight from a user using the stair ramp 100. The third tread 132 can comprise a horizontal planar surface, and can be formed of any of the materials described above with respect to first and second treads 112, 122. The third tread 132 can comprise first and second ends coupled or directly attached to first and second, or left and right, risers or lateral risers 134. The third risers 134, like the tread 132, can be formed of any of the materials described above.

The third step 132 can comprise an outer width or third outer width $W_{O3}$ that defines the outer lateral extent of the third step 130 or third tread 132, and can be coterminous with the third risers 134. In other instances, a nose, lip, or overhang can be created by the third tread 132 extending past or beyond one or more surfaces of the third risers 134. The third tread 132 in some instance can comprise slats, notches, grooves, or holes formed through the tread 132. The third step 130 can similarly comprise an inner width or third inner width $W_{I3}$ that defines the inner lateral extent of the third step 130 or third tread 132. The third step 130 can also comprise the thickness T, which can be constant or vary across the second step 130. The third step 130 can also comprise a third outer height $H_{O3}$ that extends in a vertical direction perpendicular to the horizontal width $W_{O3}$. Similarly, the third step 130 can additionally comprise a third outer depth $D_{O3}$ that extends in a direction perpendicular to the horizontal width $W_{O3}$ and the vertical height $H_{O3}$. The third step 130 can also comprise a corresponding third inner depth $D_{I3}$ and third inner height $H_{I3}$. The third step 130 can also comprise bottom panel or surface 135 opposite third tread 132, as shown in FIG. 1E, to enclose the third step as a drawer or storage area.

The first step 110 can comprise or be positioned at a first height $H_{O1}$. The second step 120 can comprise or be positioned at a second height $H_{O2}$ less than the first height $H_{O1}$. The third step 130 can comprise or be positioned at a third height $H_{O3}$ less than the second height $H_{O2}$. As such, the third step 130 can be nestable within the second step 120 such that when the stair ramp 100 is in a closed or collapsed position the third step 130 can be aligned with, or be within a footprint of, the second step 120. Additionally, the third step can be nestable within both the first step 110 and the second step 122. On the other hand, when the collapsible stair 100 is in an open position, a lateral offset between the third step 130 and the second step 120 can be increased such that an entirety, substantially an entirety, or a majority of the second step 120 and the third step 130 do not overlap. Stated another way, no portion, or only a small portion, such as less than or equal to 5%, 10%, or 20% of the second step 120 and the third step 130 can overlap or share a footprint. In any event, the second step 120 and the third step 130 can be slidably coupled together with alignment members, connecting members, sliding tracks, drawer slides, wheels, or pivoting arms 140 as well as with other suitable attachment mechanism. The third step 130 can comprise a third back or back panel, similar to the third risers 134, that can be coupled to the third tread 132, and the third risers 134. The third step 130, or the smallest or lowest of the steps included within the stair ramp 100, can also comprise a third front or front panel 138, opposite the third back panel, that can provide an enclosed storage area or cupboard. As shown in FIG. 1E with arrow 139, the front panel 138 can be rotatably or pivotably coupled to the third step 130, such as a cupboard door, with one or more hinges 142. Alternatively, the front panel 138 can be part of a sliding drawer that is box shaped and slidably insertable into the interior portion of the third step 130.

In order to accommodate the alignment members 140, and the nesting of the third step 130 within the second step 120, and the second step 120 within first step 110, the first inner width $W_{I1}$ of the first step 110 can be greater than the second outer width $W_{O2}$ of the second step 120. Similarly, the second inner width $W_{I2}$ of the second step 120 can be greater than the third outer width $W_{O3}$ of the third step 130.

Figure 1C:
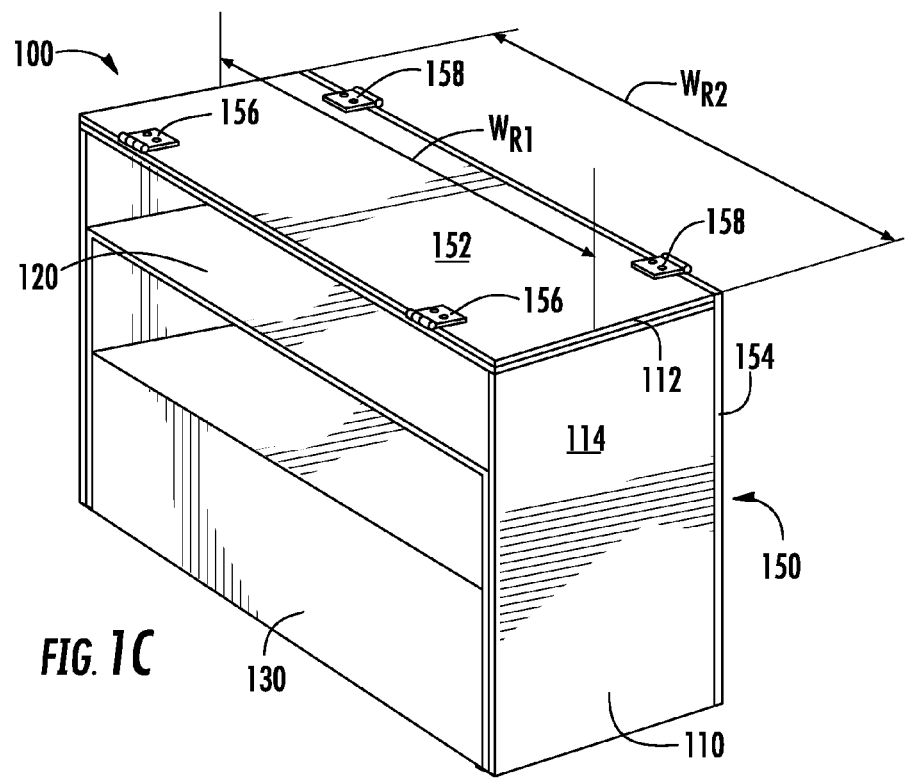
Figure 1D:
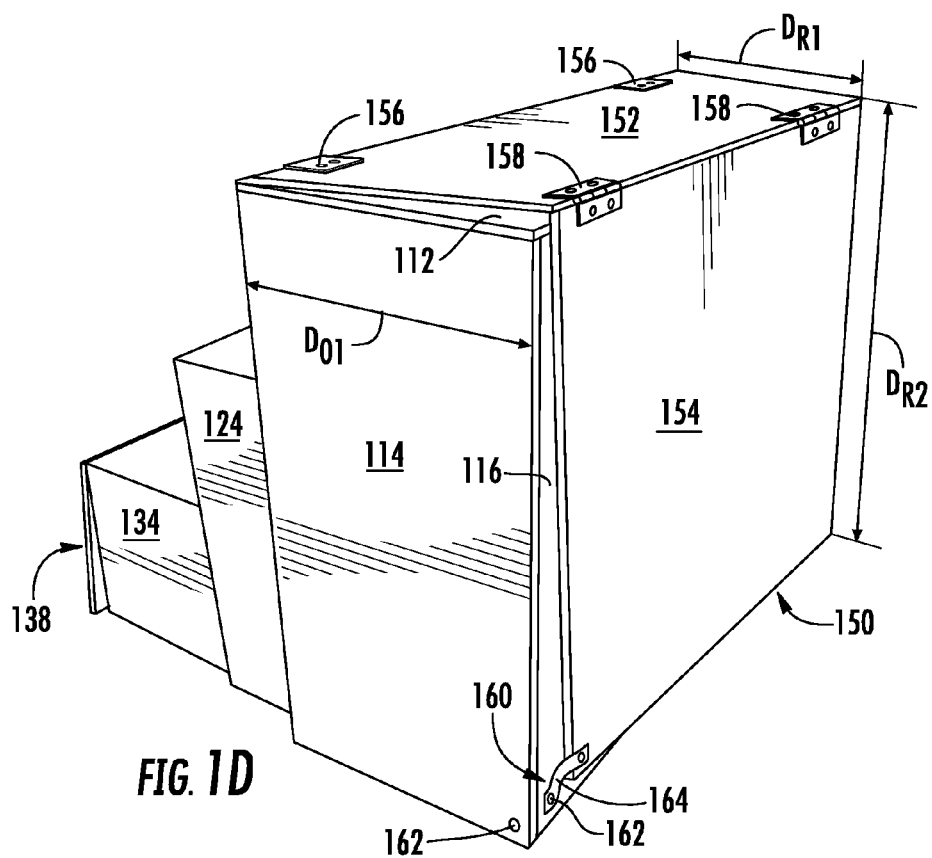
Figure 1E:
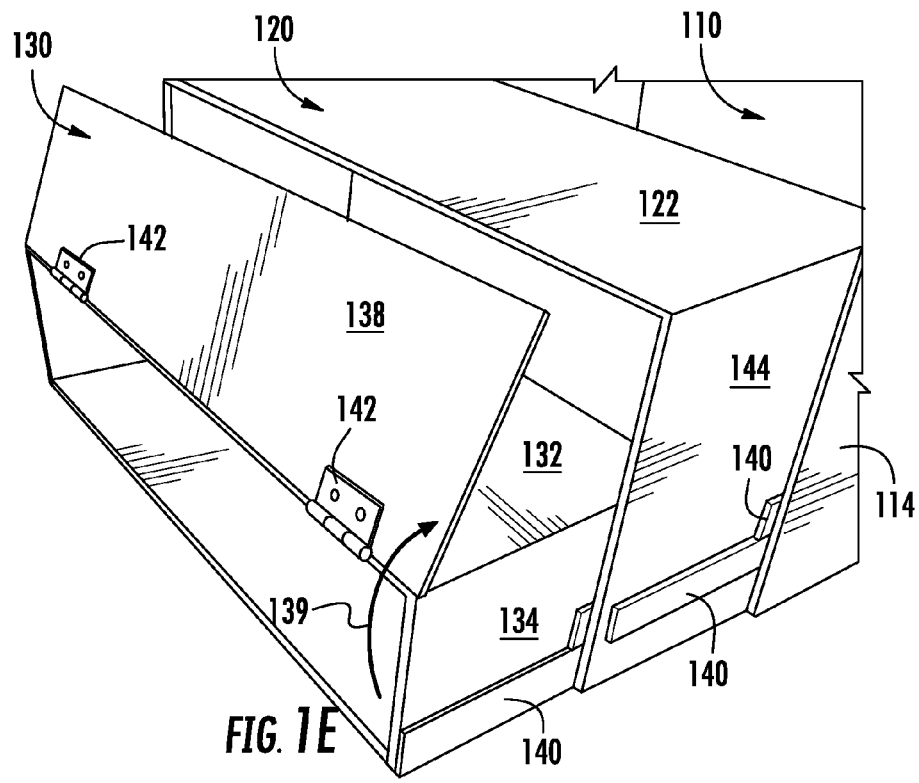
Figure 1F:
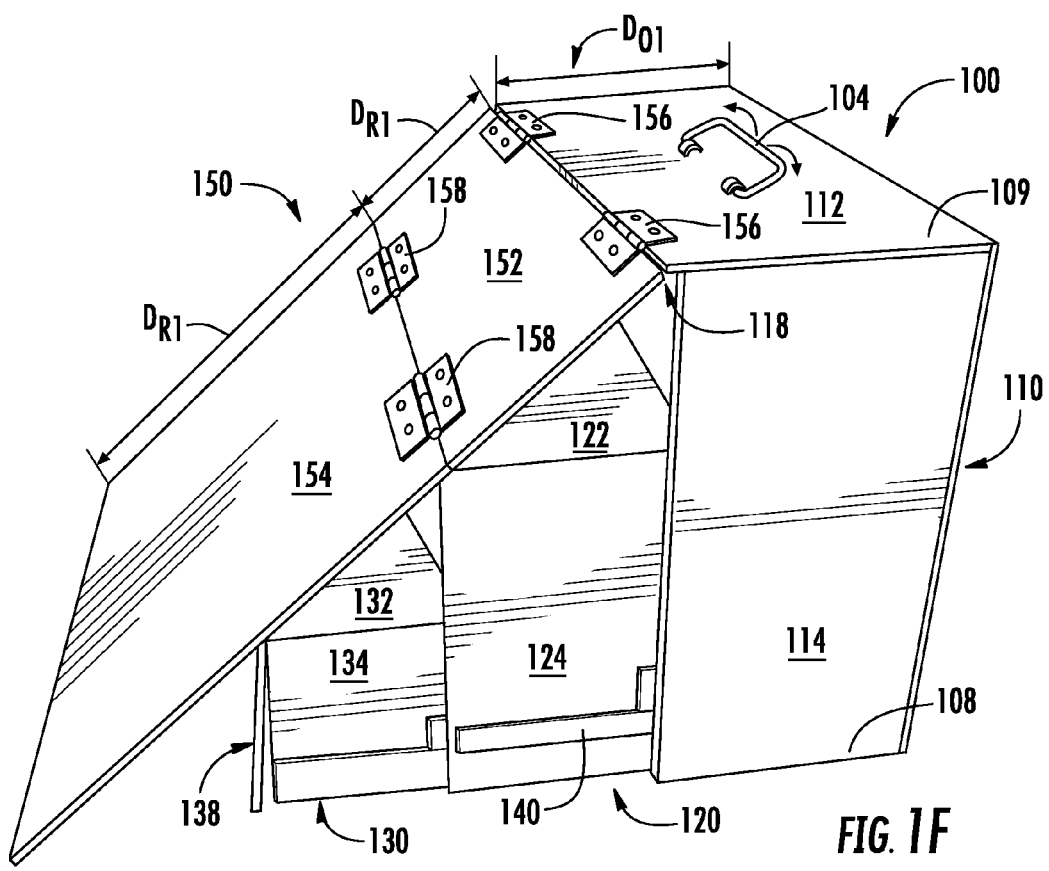

While the stair ramp 100 can also comprise a ramp or folding ramp 150, as shown e.g. in FIGS. 1C, 1D, and 1F, the ramp 150 has been omitted from FIGS. 1A and 1B for convenience in showing and describing features that might otherwise be obscured by the inclusion of the ramp 150. A person of ordinary skill will understand the ramp 150 could be included in the illustrations of the FIGS. 1A and 1B in accordance with the present disclosure.

FIG. 1B shows a side perspective view of the stair ramp 100 similar to the view shown in FIG. 1A. FIG. 1B also shows a handle 104, which includes a foldable or collapsible handle that can be coupled to the stair ramp 100, such as to the top tread 112 or the back panel 116. The handle can be can provide an easy and convenient way for a user to move, locate, carry, and reposition the stair ramp 100. The handle 104 can be used in connection with the wheels 104 to facilitate movement of the stair ramp 100 without lifting the stair ramp 100 into the air and without bearing the weight of stair ramp 100. In some instances, the handle 104 can be a telescoping handle that allows the handle to extend upwards, away from the base 108 or the floor 106, when the handle 1-4 is in use so that the mover does not have to stoop or lean over to reach the handle 104, and can more easily maneuver the stair ramp 100, such as with wheels 102. When not in use, the telescoping handle 104 can be retracted and contained within, or at a surface, of the stair ramp 100 to be out of the way of the treads 112, 122, and 132 or the ramp 150 when the stair ramp 150 is in use. Similarly, when the handle 104 is a foldable handle, the handle 104 can fold down into the stair ramp 100, such as into a recess in the stair ramp 100, including within the ramp 150, the first step 110, the first tread 112, and the back panel 116, so as to be out of the way of a user going up or down the treads 112, 122, and 132 or the ramp 150.

Another non-limiting example of an embodiment of the handle 104 is shown in FIG. 1F, in which the handle 104 is coupled to a top center portion of the first tread 112 of the first step 110. The handle can lie down flush with the top surface of the first tread 112 when not in use, and can rotate upwards away from the top surface of the first tread 112 allow for a person to easily grasp the handle 104 to move or transport the stair ramp 100.

FIG. 1B also shows carpet 144 disposed over, and coupled to, treads 112, 122, and 132 for one or more of comfort, traction, durability, safety, or looks.

FIG. 1C shows a perspective view of the stair ramp 100 similar to the view shown in FIG. 1A. FIG. 1C differs from FIG. 1A by showing the first step 110, the second step 120, and the third step 130 in a nested, retracted, or compact position rather than the extended or in-use configuration shown in FIG. 1A. As such, the FIG. 1C shows the first step 110, the second step 120, and the third step 130 sharing a common footprint, or being disposed within one another's foot prints.

FIG. 1C additionally shows the ramp 150 as part of the stair ramp 100 and coupled to the first tread 112 of the first step 110. The ramp 150 can comprise one or more segments or portions, such as first segment or portion 152 and second segment or portion 154. While two segments 152 and 154 are shown, in various instances any other desirable number of segments can also be used, such as one, two, three, four, or more segments. The segments of the ramp 150, such as segments 152 and 154, can be formed of any of the materials described above for the stair ramp 100 generally.

The ramp 150 can be rotatably coupled to the stair ramp 100, such as at the first step 110, the ramp 150 moving from a first position and a second position. The first position or stair position can be for storing or storage of the ramp 150 that leaves the steps of the stair ramp 100, such as first step 110, the second step 120, and the third step 130, exposed or usable as part of the stair ramp 100. Additionally, the stair ramp 100 can be in the stair position when the second step 120 and the third step 130 are exposed or left uncovered from the ramp 150, while the first step 110 is covered or uncovered by the ramp 150. In some instances, a portion of the ramp 150, such as segment 152, can cover the first step 110 while keeping the step 110 accessible and usable as a step when the stair ramp is in a stair position. In other instances, the ramp 150, including the segment 152, can leave all of the steps uncovered, including the first step 110, keeping the steps 110, 120, 130 accessible and usable. The second position or ramp position can be for use of the ramp 150, with the ramp 150 covering the steps of the stair ramp 100, such as first step 110, the second step 120, and the third step 130.

The ramp 150 may be coupled to the stair ramp 100, such as step 110, with rotatable connectors 156, such as hinges, straps, or detachable hooks, tabs, flanges, channels, or interlocking members. The rotatable connectors 156 may be formed as hinges, such as butt hinges, T-hinges, strap hinges, gate hinges, Soss hinges, continuous hinges, double acting hinges, pivot hinges, self-closing hinges, or other suitable hinges made of metal, wood, plastic, or other suitable organic or synthetic material. The rotatable connectors 156 may also be formed as straps or sections of a flexible material that facilitates rotational movement, such as nylon straps, leather straps, plastic straps, or any other suitable type of strap. The rotatable connectors 156 may also be formed as detachable hooks, tabs, flanges, channels, or interlocking members that allow the ramp 150 to be completely detached from the stair ramp 100, or first step 110, for movement between the stair position and the ramp position, the ramp 150 locking into either the stair position or away from the steps for storage and the ramp position. In other instances the rotatable connectors 156 will not be detachable.

Similarly, additional rotatable connecters similar to the rotatable connectors 156 can be used to rotatably or moveably connect various segments or portions of the ramp 150. For example, rotatable connectors 156 can couple the first segment 152 to the second segment 154 of the ramp 150. The rotatable connectors 158 can be hinges, straps, or detachable hooks, tabs, flanges, channels, or interlocking members that can be the same or different than rotatable conneceters 156. The rotatable connectors 156 and 158 can be mounted on a top surface, bottom surface, or between top and bottom surfaces of the features to which they are mounted, such as first stair 110 and the ramp 150 or ramp segments 152 and 154. As such, the rotatable connectors 156 and 158 can be exposed when the ramp 150 is in the first stair position, in the second ramp position, or both.

As a non-limiting example, FIG. 1C shows the upper segment 152 and the lower segment 154 of the ramp 150 coupled with hinges 158. The ramp 150 is shown positioned or stored in the first stair position in which the first segment 152 can be positioned resting on, in direct contact with, and substantially aligned with or sharing a footprint with, the first tread 112. Similarly, the second segment 154 is shown resting on, in direct contact with, and substantially aligned with the back panel 116. Thus, when used as stairs the segments 152, 154 of the ramp 150 can be out of the way, and lying flat against, or in direct contact with the first step 110. Additionally, the ramp 150 or segments thereof, such as segment 154 can comprise, or be coupled to, attachment members 160 that can be hooks, snaps, buttons, clips, or other mechanism to hold the ramp segment 154 to the back panel 116 to minimize or prevent undesired movement of shifting of the ramp segment 154 with respect to the back panel 116. FIG. 1D shows a non-limiting example in which the attachment member 160 is shown as snap 162 coupled to a strap 164, for connecting the ramp segment 154 to the first riser 144.

To accommodate or facilitate the integration of the ramp 150 into the stair ramp 100, a width $W_{R1}$ of the first segment 152 can be the same or similar to the width $W_{O1}$ of the first tread 112, such as with a percent difference less than or equal to 1%, 5%, 10%, or 20%, as shown in FIG. 1C. Additionally, a depth $D_{R1}$ of the first ramp segment 152 can be the same or similar to that of the depth $D_{O1}$ of the first tread 112, such as with a percent difference less than or equal to 1%, 5%, 10%, or 20% as shown in FIG. 1C. Similarly, to accommodate or facilitate the integration of the ramp 150 into the stair ramp 100, a width $W_{R2}$ of the second segment 154 can be the same or similar to the width $W_{O1}$ of the first step 110 or the back panel 116, such as with a percent difference less than or equal to 1%, 5%, 10%, or 20%, as shown in FIG. 1C. Additionally, a depth $D_{R2}$ of the second ramp segment 154 can be the same or similar to that of the height $H_{O1}$ of the first step 110, or back panel 116, such as with a percent difference less than or equal to 1%, 5%, 10%, or 20% as shown in FIG. 1D. Thus, as shown in FIGS. 1C and 1D, when the segmented ramp 150 is in the first storage or stair position, the underside of first segment 152 of the ramp 150 can be stacked over, and serves as, the tread of the first step 110 such that a user can step on the first step 110, the second step 120, and the third step 130 to ascend or descent the stair ramp 100.

As also shown in FIG. 1C, the collapsible stair ramp 100 can be formed with a series of nesting steps, such as the first step 110, the second step 120, and the third step 130, each of which can be formed as hollow boxes or cubes with at least one open side, or no more than five sides, no more than four sides, or no more than three sides so that space exists for the series of nesting steps to be fit one within another. When three steps are used, as shown in FIG. 1C, the first step 110 can be formed as a hollow first box with an open side, with no more than five sides, no more than four sides, or no more than three sides. The second step 120 can be formed as a hollow second box with an open side, with no more than five sides, or no more than four sides, the second step 120 being smaller than the first step 110, and fitting within the first step 110. The third step 130 can be formed as a hollow third box with an openable or removable side, the third step 130 being smaller than the second step 120, and fitting within the second step 120.

FIG. 1E illustrates a close-up view of the stair ramp 100 showing the second step 120 and the third step 130. The third step 130 can comprise a front face or front panel 138 that can be removable from the third tread 132 and the third risers 134, being formed as part of a drawer or door that can slide, swing, or be otherwise moved to provide access to storage within the third step 130. In some instances, the front panel 138 can be an openable sixth side, such as a door that can be coupled to the third step 130, such as the third tread 132 with rotatable connectors 142, such as hinges, straps, or detachable hooks, tabs, flanges, channels, or interlocking members. Arrow 139 illustrates a possible direction of movement of the panel 138 rotatably openable with hinges 142.

As seen in FIGS. 1A, 1B, and 1E, alignment members 140 can be slidably attached and slidably connected to the first step 110, the second step 120, and the third step 130 to allow and facilitate translational movement between the open position and the closed position of the stair ramp 100, with the steps extended or nested with respect to each other. The stair ramp 100 can also be formed or situated so that the first step 110, the second step 120, and the third step 130 maintain a horizontal alignment in both the open position and the closed position.

FIG. 1F illustrates the stair ramp 100 being in the second ramp position, where the ramp 150 extends from the first tread 112 and is disposed over and covers the second tread 122 and the third tread 132, allowing a user to ascend or descend between the floor 106 to a top 109 of the stair ramp 100 along a smooth planar surface provided by the ramp or incline 150. In the second position or ramp position of the stair ramp 100, an interface, joint, or meeting 153 of ramp segments, such as segment 152 and 154 along a line of attachment with rotatable connectors or hinges 158 can be aligned with, and supported by, corners or edges of the stairs 110, 120, and 130. More specifically, the abutment of segments 152 and 154 can occur along the leading edge of the second tread 122, or at a nose, lip, or edge of the second tread 120 when present. Thus, the rotatable joint or interface 153 of the ramp 150 can occur at the top of the second highest step, which can be the second step 120 when three steps are used.

Alternatively, when the interface 153 of the ramp 150 do not align with or are disposed over the leading edge of a step, the ramp segments, such as segments 152 and 154 can, lock into a rigid or stabilized position to prevent the segments of the ramp 150 from folding or rotating with respect to each other when loaded or supporting weight, such as the weight of a person, pet, cart, or other object using the ramp 150. When an overall depth of the ramp 150 is divided into a first depth $D_{R1}$ and a second depth $D_{R2}$, relative movement or rotation of the ramp 150 can be with respect to the width W, such as $W_{R1}$ and $W_{R2}$ of the ramp 150 or the steps, such as the first step 110, the widths being perpendicular to a direction of travel up and down the stairs.

In either event, the first step 110, the second step 120, and the third step 130 can be horizontally oriented and substantially parallel to the floor 106 or the surface on which the stair ramp 100 is placed. The ramp 150 can also be angled across the horizontally oriented first step 110, the second step 120, and the third step 130.

The stair ramp 100 can be used by positioning the stair ramp on the floor 106 near or adjacent the item or place to be accessed, such as by positioning the stair ramp 100 with one or more of the handle 104 and the wheels 102. For using the stair ramp 100 in the first position or stair position, the steps can be pulled out from their nested position, and the user can then go up and down the expanded stairs. When the second position or ramp positions is desired, the ramp 150 can be extended or rotated from a storage position to an in-use position, such as from against the back surface 116 of the first step or the stair ramp 100 to extending at an angle from the top of the stair ramp 100 to the floor 106. The angled ramp 150 can be placed in its in-use position with the steps extended so that the ramp 150 moves over and rests upon the steps. Alternatively, the angled ramp 150 can be placed in its in-use position with the steps not extended and in a nested position, one within the other, so that the ramp 150 does not rest on the steps, such the second step 120 and the third step 130.

Figure 2A:
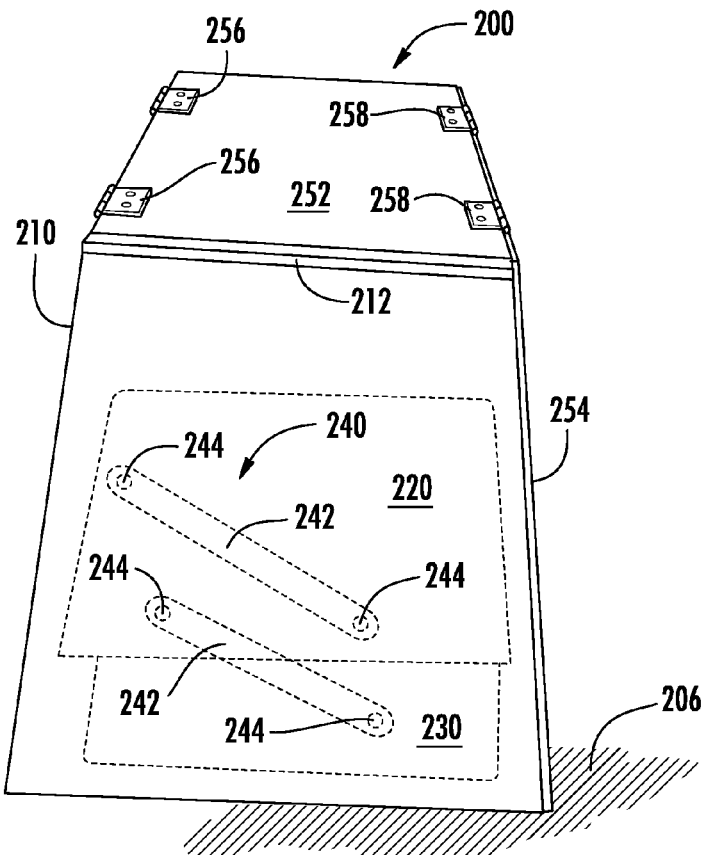
FIGS. 2A-2C illustrate various view of an embodiment of a collapsible stair with foldable ramp.
Figure 2B:
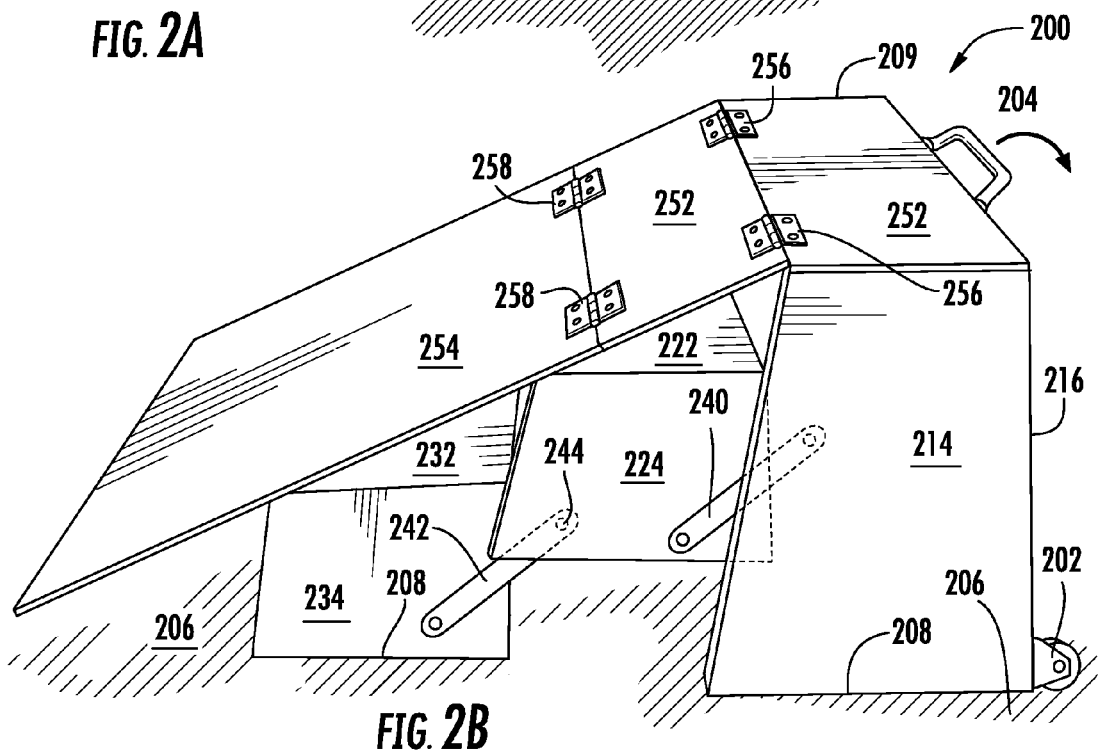
Figure 2C:
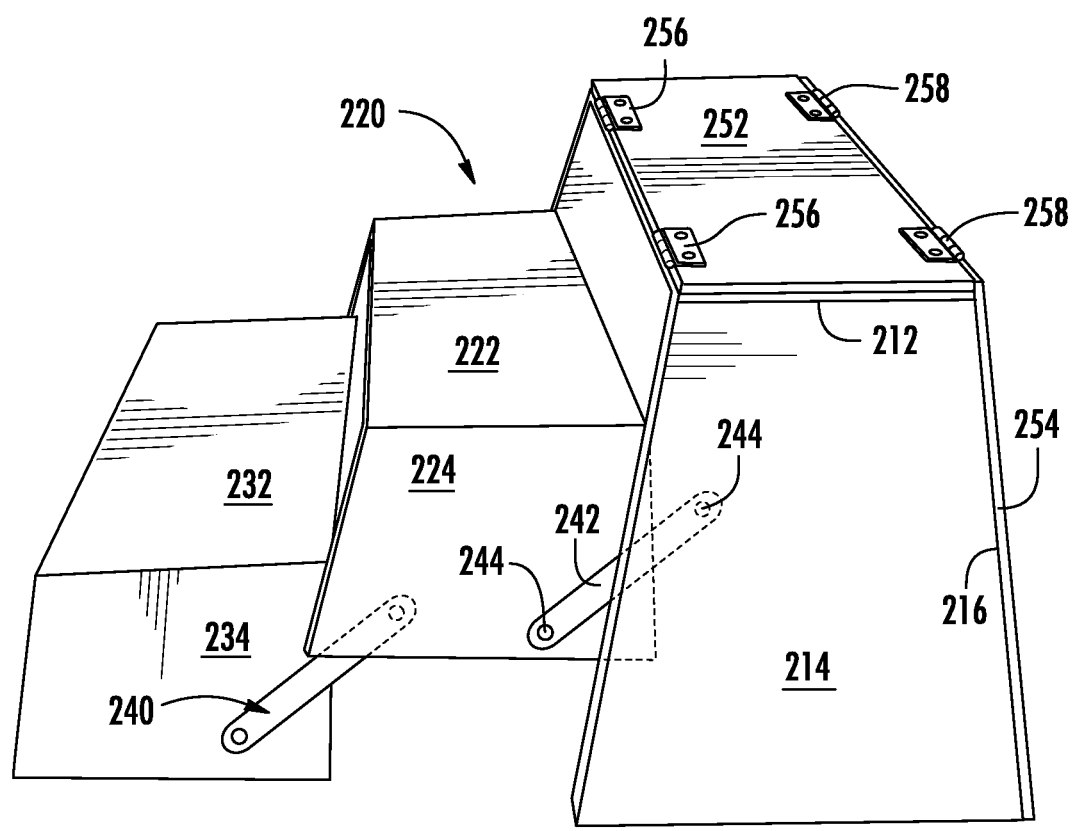

FIGS. 2A-2C illustrate other aspects of a stair ramp with the stair ramp 200, which can also be referred to as a collapsible stair ramp, collapsible stair with foldable ramp, portable and collapsible pet stair and ramp. Elements of the stair ramp 200 can be similar or identical to those of the stair ramp 100, unless otherwise noted, with element numbers for the stair ramp 200 being increased by 100 from the elements of the stair ramp 100.

FIG. 2A illustrates the first step 210, the second step 220, and the third step 230 are in a closed or nested position and are pivotably attached with alignment members or connecting members 240 to move rotationally between the open position (shown in FIGS. 2B and 2C) and the closed position (shown in FIG. 2A). The connecting members 240 can be an accordion type attachment that allows for extending the steps 220, 230 with pivoting arms 242 coupled to the steps 210, 220, and 230 with first and second pin joints 244 at opposing ends of the arms 242. The rotational connecting members 240 are in contrast to the translational or sliding alignment members 140 used with the stair ramp 100. The first step 210, the second step 220, and the third step 230 can maintain a horizontal alignment in both closed position or nested position shown in FIG. 2A, as well as in the open position or extended position shown in FIGS. 2B and 2C.

While FIGS. 2A-2C show a non-limiting example in which the body or overall shape of the stair ramp 200 is tapered or trapezoidal, with sloped or angled sides. However, the stair ramps 100, 200, can angle or extend in any desirable configuration and are not limited to perpendicular angles or angled sides extending from a wider base to a narrower top.

Additionally, the sides or body of the stair ramps 100, 200 can be oriented at any desirable angle, including undercut (moving from a wider top to narrower base), and angled as a parallelogram. When the stair ramps 100, 200 comprise a rectilinear shape with right angles or squared corners, the stair ramps can be abutting flush against other rectilinearly shaped objects with right angles or squared corners, such as wall, cabinets, counters, beds, or any other object or member, without creating a gap or space between the stair ramp 200, and the object or member against which it is positioned.

FIG. 2B illustrates the stair ramp 200 being in the second ramp position, where the ramp 250 extends from the first tread 212 and is disposed over and covers the second tread 222 and the third tread 232, thereby allowing the user to ascend or descend between the floor 206 to a top 209 of the stair ramp 200 along a smooth planar surface provided by the ramp or incline 250. In the second position or ramp position of the stair ramp 200, an interface, joint, or meeting 253 of ramp segments, such as segment 152 and 154 along a line of attachment with rotatable connectors or hinges 158 can be aligned with, and supported by, corners or edges of the stairs 210, 220, and 230. More specifically, the abutment of segments 252 and 254 can occur along the leading edge of the second tread 222, or at a nose, lip, or edge of the second tread 220 when present. Thus, the rotatable joint at the interface 253 of the ramp 250 can occur at the top of the second highest step, which can be the second step 220 when three steps are used.

Alternatively, when the interface 253 or rotatable joint or segments of the ramp 150 does not align with or are disposed over the leading edge of a step, the ramp segments, such as segments 252 and 254 can lock into a rigid or stabilized position to prevent the segments 252, 254 of the ramp 250 from folding or rotating with respect to each other when loaded or supporting weight, such as the weight of a person, pet, cart, or other object using the ramp 250. When an overall depth of the ramp 250 is divided into a first depth and a second depth, relative movement or rotation of the ramp 250 can be with respect to the width of the ramp 250 or the steps, such as the first step 210, the widths being perpendicular to a direction of travel up and down the stairs.

In either event, the first step 210, the second step 220, and the third step 230 can be horizontally oriented and substantially parallel to the floor 206 or the surface on which the stair ramp 200 is placed. The ramp 250 can also be angled across the horizontally oriented first step 210, the second step 220, and the third step 230.

The stair ramp 200 can be used by positioning the stair ramp on the floor 206 near or adjacent the item or place to be accessed, such as by positioning the stair ramp 200 with one or more of the handle 204 and the wheels 202. For using the stair ramp 200 in the first position or stair position (shown e.g. in FIG. 2C), the steps 220, 230 can be pulled out from their nested position, and the user can then go up and down the expanded stairs. When the second position or ramp positions is desired (shown e.g. in FIG. 2B), the ramp 250 can be extended or rotated from a storage position to an in-use position, such as from against the back surface 216 of the first step or the stair ramp 200 to extending at an angle from the top of the stair ramp 200 to the floor 206. The angled ramp 250 can be placed in its in-use position with the steps extended so that the ramp 250 moves over and rests upon the steps. Alternatively, the angled ramp 250 can be placed in its in-use position with the steps not extended and in a nested position, one within the other, so that the ramp 250 does not rest on the steps, such the second step 220 and the third step 230.

Where the above examples, embodiments and implementations reference examples, it will be understood by those of ordinary skill in the art that other manufacturing devices and examples could be intermixed or substituted with those provided as virtually any components consistent with the intended operation of a method, system, or implementation may be utilized. Accordingly, for example, although particular component examples may be disclosed, such components may be comprised of any shape, size, style, type, model, version, class, grade, measurement, concentration, material, weight, quantity, and/or the like consistent with the intended purpose, method and/or system of implementation. In places where the description above refers to particular embodiments, it should be readily apparent that a number of modifications may be made without departing from the spirit thereof and that these embodiments and implementations may be applied to other to gear and equipment technologies as well. Accordingly, the disclosed subject matter is intended to embrace all such alterations, modifications, and variations that fall within the spirit and scope of the disclosure and the knowledge of one of ordinary skill in the art. The presently disclosed embodiments are, therefore, to be considered in all respects as illustrative and not restrictive.

What is claimed is:

1. A collapsible stair ramp, comprising:
a first step;
a second step nestable within the first step such that when the collapsible stair ramp is in a closed position the second step is aligned with the first step and when the collapsible stair ramp is in an open position a lateral offset between the second step and the first step is increased;
a third step nestable within the first step and the second step such that when the collapsible stair ramp is in the closed position the third step is aligned with the second step and when the collapsible stair ramp is in the open position a lateral offset between the third step and the second step is increased; and
a ramp rotatably coupled to the first step to rotate from a stair position to a ramp position, wherein:
the stair position comprises the second step and the third step being exposed from the ramp, wherein the ramp overlays a back surface of the collapsible stair ramp, and
wherein the ramp position comprises the second step and the third step being covered by the ramp;
wherein the first step, the second step, and the third step share a common footprint in the closed position.

2. The collapsible stair ramp of claim 1, wherein the stair position further comprises the ramp overlaying the first step and the back surface of the collapsible stair ramp such that a user can step on the first step, the second step, and the third step to ascend or descent the collapsible stair ramp.

3. The collapsible stair ramp of claim 1, wherein:
the first step is positioned at a first height;
the second step is positioned at a second height less than the first height; and
the third step is positioned at a third height less than the second height.

4. The collapsible stair ramp of claim 1, wherein:
the first step is formed as a hollow first box comprising no more than 5 sides;
the second step is formed as a hollow second box smaller than the first box and comprising no more than 5 sides; and
the third step is formed as part of a hollow third box smaller than the second box and comprising an openable sixth side for storage.

5. The collapsible stair ramp of claim 1, wherein:
an inner width of the first stair is greater than an outer width of the second stair; and
an inner width of the second stair is greater than an outer width of the third stair.

6. The collapsible stair ramp of claim 1, wherein the first stair, the second stair, and the third stair are pivotably attached and move rotationally between the open position and the closed position.

7. The collapsible stair ramp of claim 1, wherein the first stair, the second stair, and the third stair are slidably attached and move translationally between the open position and the closed position.

8. A collapsible stair ramp, comprising:
a first step;
a second step nestable within the first step such that when the collapsible stair ramp is in a closed position the second step is aligned with the first step and when the collapsible stair ramp is in an open position a lateral offset between the second step and the first step is increased;
a third step nestable within the first step and the second step such that when the collapsible stair ramp is in the closed position the third step is aligned with the second step and when the collapsible stair ramp is in the open position a lateral offset between the third step and the second step is increased; and
a ramp rotatably coupled to the first step to rotate from a stair position to a ramp position, wherein the stair position comprises the second step and the third step being exposed from the ramp, and wherein the ramp overlays a back surface of the collapsible stair ramp and wherein the ramp position comprises the second step and the third step being covered by the ramp.

9. The collapsible stair ramp of claim 8, wherein the stair position further comprises the ramp overlaying the first step and the back surface of the collapsible stair ramp such that a user can step on the first step, the second step, and the third step to ascend or descent the collapsible stair ramp.

10. The collapsible stair ramp of claim 8, wherein:
the first step is positioned at a first height;
the second step is positioned at a second height less than the first height; and
the third step is positioned at a third height less than the second height.

11. The collapsible stair ramp of claim 8, wherein the first step, the second step, and the third step share a common footprint in the closed position.

12. The collapsible stair ramp of claim 8, wherein the first stair, the second stair, and the third stair are pivotably attached and move rotationally between the open position and the closed position.

13. The collapsible stair ramp of claim 8, wherein the first stair, the second stair, and the third stair are slidably attached and move translationally between the open position and the closed position.

* * * * *